United States Patent [19]

Marks

[11] Patent Number: 4,841,946

[45] Date of Patent: Jun. 27, 1989

[54] SOLAR COLLECTOR, TRANSMITTER AND HEATER

[76] Inventor: Alvin M. Marks, 359 R Main St., Athol, Mass. 01331

[21] Appl. No.: 923,390

[22] Filed: Oct. 27, 1986

Related U.S. Application Data

[63] Continuation-in-part of Ser. No. 581,265, Feb. 17, 1984, Pat. No. 4,619,244.

[51] Int. Cl.$^4$ ................................................ F23J 3/02
[52] U.S. Cl. .................................... 126/451; 126/438; 126/439; 126/425
[58] Field of Search ............... 126/438, 424, 425, 451, 126/439

[56] References Cited

U.S. PATENT DOCUMENTS

| | | | |
|---|---|---|---|
| 1,951,404 | 3/1934 | Goddard | 126/438 |
| 3,171,403 | 3/1965 | Drescher | 126/451 |
| 3,998,206 | 12/1976 | Jahn | 126/438 |
| 4,343,294 | 8/1982 | Daniel | 126/438 X |
| 4,627,418 | 12/1986 | Gibson et al. | 126/438 |

Primary Examiner—Larry Jones

[57] ABSTRACT

A Solar Power collector, sunfollower, power transmitter and receiver is described. The Solar power collector is a Cassegrain Reflector optical system mounted on a carriage travelling on a semicircular track. A small photovoltaic cell and rechargeable battery provide the power to position the collector. A computer, sensors, electronic circuit and two servomotors provides accurate alignment of the collector with the sun's rays during the day, and returns it to follow the sun again the next morning. Sun-power is preferably transmitted from the collector via a light-pipe to a cavity where it is converted to heat-power. The heat-power may be stored as heat energy in a phase change material at a suitable temperature for cooking or other uses, such as heat-electric power generation. A plurality of collector-sunfollowers may transmit light-power to a single cavity heat storage depot, from which heat-power may be supplied on demand to various utilities.

25 Claims, 6 Drawing Sheets

SOLAR COLLECTOR, TRANSMITTER AND HEATER

RELATED ART

This invention is a continuation-in-part of U.S. patent Ser. No. 581,265 filed Feb. 17, 1984 entitled "Solar Heater with Cavity and Phase Change Material" which will issue Oct. 28, 1986 as U.S. Pat. No. 4,619,244, which includes the Prior Art, incorporated herein in whole or in part by reference.

FIELD OF THE INVENTION

This invention relates to a system comprising a Solar Collector on a Sunfollower, means for transmitting the Solar-Power and means for receiving storing and utilizing the Solar Power.

INTRODUCTION

The sun collector may be of any type such as a Fresnel Lens or Cassegrain Reflector Optical System mounted on the Sunfollower. The sun collector and sunfollower system may comprise a Cassegrain Reflector optical system mounted on carriage travelling on a semicircular track. A ray from the sun passes through the origin of a polar coordinate system. The origin of the coordinate system coincides with the focus of the optical system which lies on its axis, and the center of the semicircular track. The angle $\alpha$ between the axis of the optical system and the horizontal axis of the track, and the angle $\epsilon$ between the plane of the track and the horizontal plane are controlled by two servomotors. A quadrant photosensor mounted on the optical axis, electronic circuits and a dedicated computer, provide accurate alignment of the optical axis with the sun's rays: following the sun during the day, and returning the system to readiness the next morning to again follow the sun. The electronic circuit and servomotors are powered by a small photovoltaic cell and rechargeable battery.

Sun-power may be delivered to a cavity containing a phase change material to convert the light power to stored heat energy at a temperature suitable for cooking, or other uses, such as heat-electric power generation. Various means of transmitting light or heat power to utilities are described.

The angles and are related to the angular position of the sun's rays. Equations are derived which relate to angular positions of the track angles $\alpha$ and $\epsilon$ as a function of a clock angle $\omega$, seasonal angle $\phi$, and a fixed latitude angle $\theta$. The electronic clock angle $\omega$ signal approximately positions the axis of the sun follower. The signals from the photosensor over ride and accurately align the optical axis of the sunfollower with the sun's rays.

The entire system is operated by a small photovoltaic array and rechargeable storage battery which provides electric power to drive the device. The light-power from the collector may be transmitted over a short or a long distance by a light-pipe terminating in a cavity containing a phase change material, and thence delivered as needed to the heat-load. Various other heat transmission means are described and may be used alternatively. The heat transmission means may comprise a heat conducting medium such as a metal rod or axially oriented graphite; or, a heat-pipe employing liquid-vapor phase change. A plurality of sunfollowers may be employed to supply a single primary cavity having a large heat storage capacity at a high temperature, with secondary transmission means for drawing off portions of the heat power for use as needed. Various phase-change heat storage materials may be used, such as a zinc-magnesium alloy.

DESCRIPTION OF THE INVENTION

Figures 1, 2:
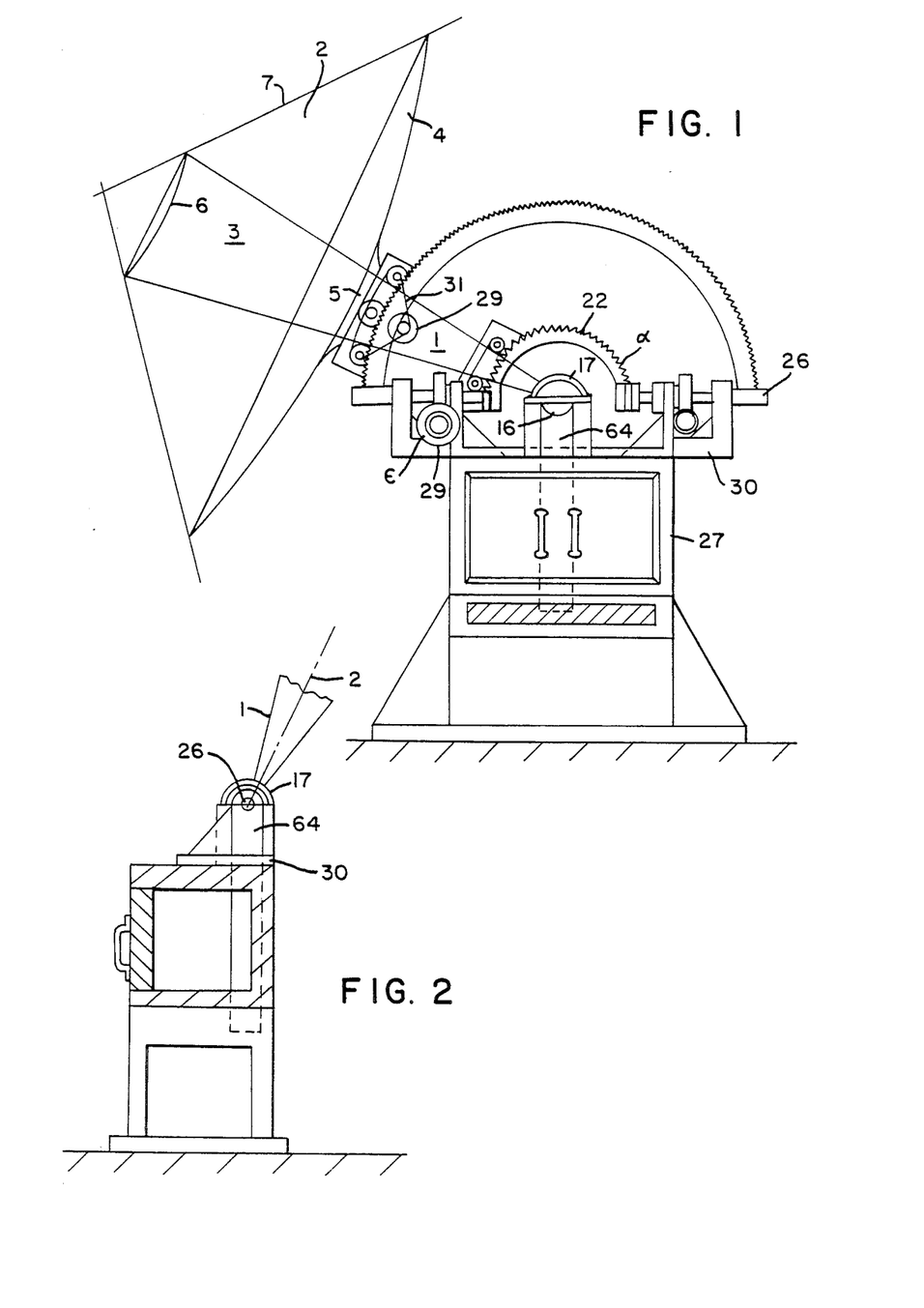
FIG. 1 shows a front cross sectional view, to about one-sixteenth scale, of a Cassegrain sunfollower, polar drive, cavity and heat conductor supplying heat-power to a heater with a phase change material in a solar-cooker.
FIG. 2 shows a side cross sectional view of the device of FIG. 1.

FIG. 1 shows a cross sectional front view of a sunfollower 1 comprising a Cassegrain optical system 2, mounted on a cooking oven 27; and, FIG. 2 shows a cross sectional side view of the same.

Figure 3:
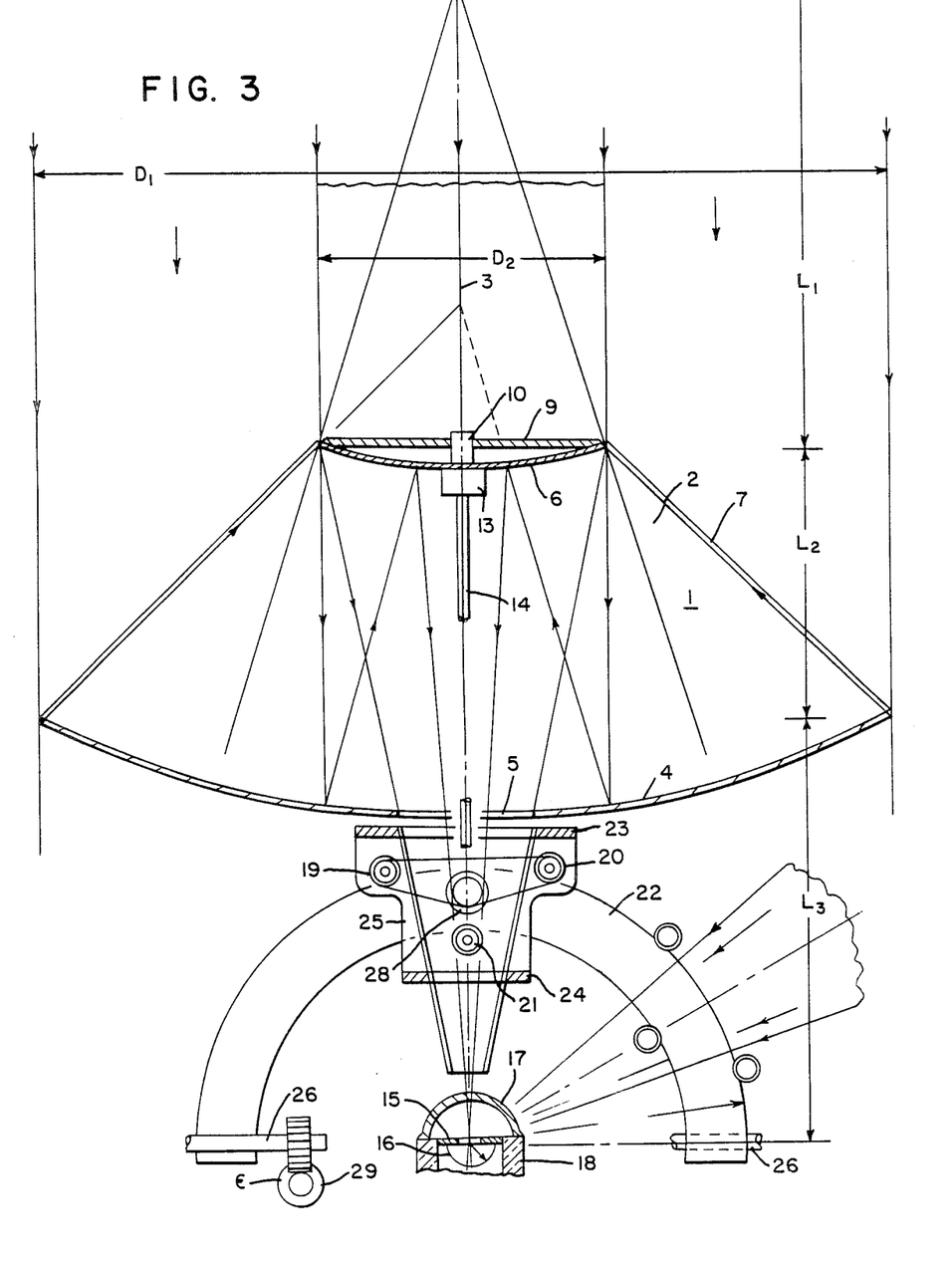
FIG. 3 shows, to a one-tenth scale, a cross sectional view of the Cassegrain reflector optical sub-assembly.

FIG. 3 shows a detailed cross sectional view of the optical system 2 of the sunfollower 1. It comprises a primary reflector 4; for example, about 2 m.diameter; and, a secondary reflector 6; for example, about 0.67 m diameter; and optionally, a plano-concave lens 8; for example, about 11 cm. diameter, and a focal length of about 18 cm. The primary reflector 4 converges the sunlight to the focal point O. The rays are intercepted by the secondary reflector 6, and focussed at the point O. The primary reflector has a hole 5 to admit rays from the secondary reflector converging to the focal point O.

The sunfollower mechanism comprises a semicircular track 22, mounted to rotate on a horizontal shaft 26 on the OX axis. The sunfollower optical system 2 is mounted on a carriage 25 which travels along the semicircular track 22. The optical axis 3 of the optical system 2 makes an angle α with the horizontal OX axis. The carriage 25 is driven by a first servomotor 28, which may be mounted on the carriage 25. Electric power may be supplied to the first servomotor 28 on the carriage 25 by a flexible cable or an electrified rail mounted parallel to the semicircular track (not shown). Alternatively, the first servomotor 28 may be mounted on the base 30, and a cable or chain 31 may be used to move the carriage. To align the optical axis 3 with the sun's rays according to its elevation, the angle ε between the plane of the semicircular track and the horizontal XOY plane is varied. First and second servomotors 28 and 29, respectively, vary the angles: α between the horizontal OX axis and the optical axis 3 in the plane of the semicircular track 25; and, ε the angle between the plane of the semicircular track and the horizontal XOY plane.

Figure 4:
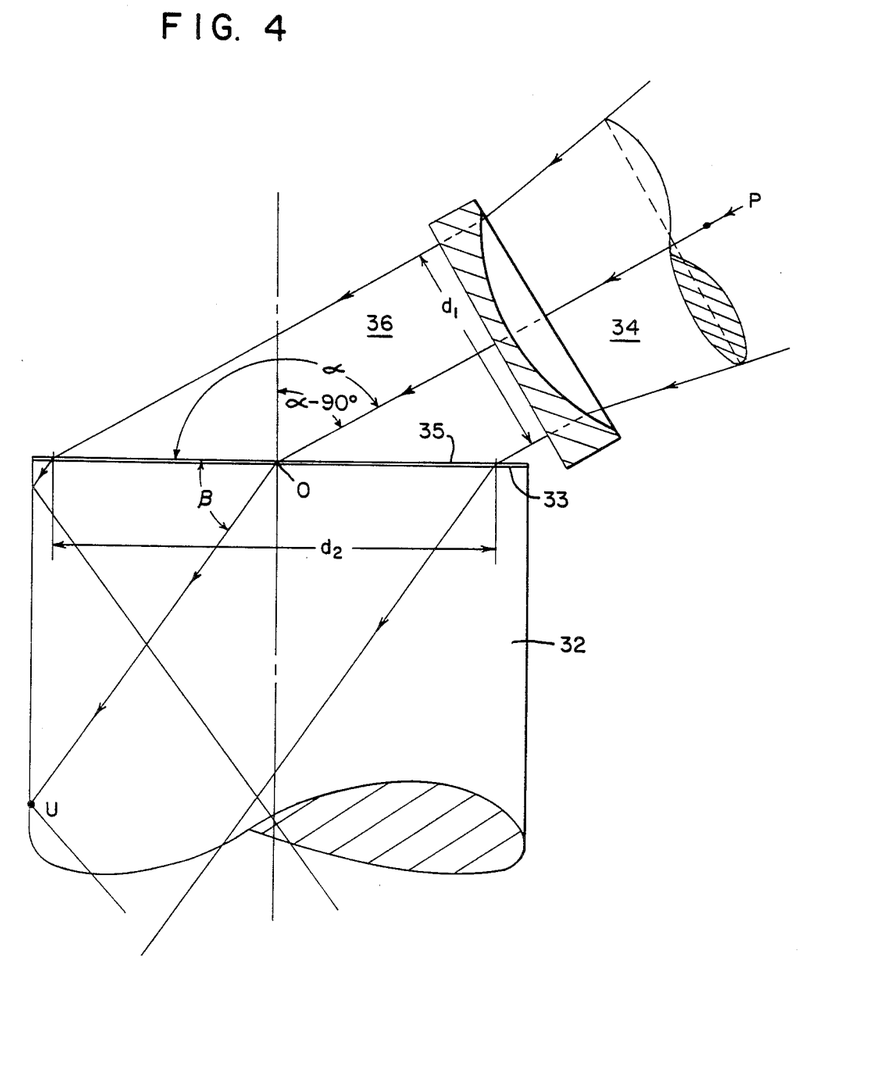
FIG. 4 shows, to full scale, a cross sectional cutaway view of a light beam from the exit aperture of the sunfollower refracted into the end surface of a light-pipe.

FIG. 4 shows a cross sectional view of a light-pipe 32. It is a transparent cylinder of glass or plastic with a plane polished end-surface 33 normal to its axis. The light beam 34 is refracted at the surface 35 into the light-pipe 33. The surface 34 is preferably coated with a low reflection coating such as $MgF_2$ to a ¼ wave thickness. The surface 35 may be located at or near the focus O of the converging light beam 34. In this case, the beam is refracted and transmitted by a light pipe 32 of minimum diameter. Alternatively, the converging light beam may first be refracted by a concave lens 8 to produce a parallel light-beam 36 spread over a larger area of surface 35. This results in a more uniform surface temperature. The refracted rays 39 are confined and light-power is transmitted within the light-pipe 32 by total internal reflection.

Figure 5:
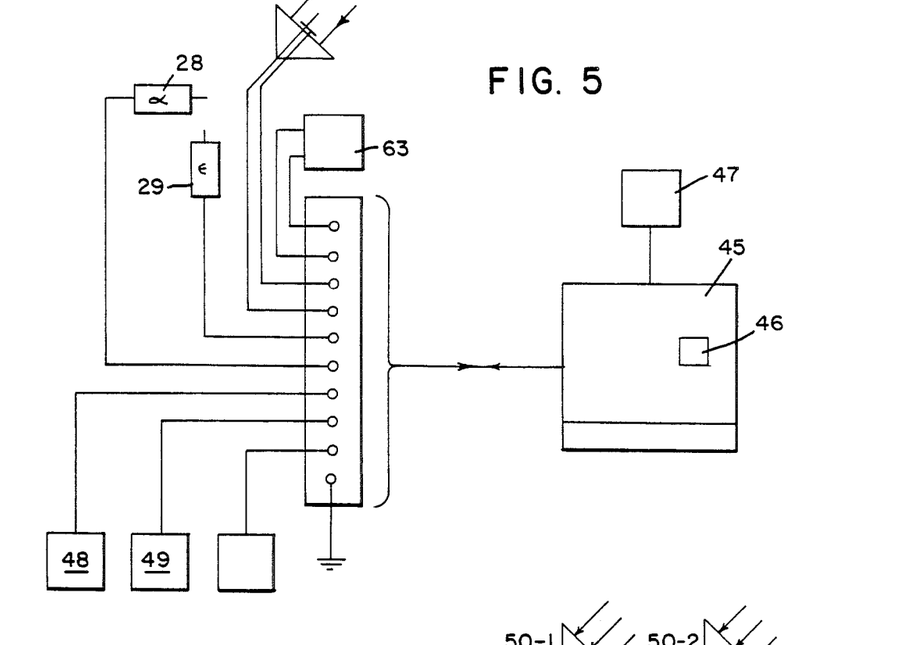
FIG. 5 shows a block diagram of the solar electric power, control and drive system for the sunfollower.

Light travels in the light-pipe 32 over a considerable distance with little attenuation; for example, 0.2 to 1 dB per Km. [1]. The light-pipe 32 is a glass rod analogous to a fiber optic light transmitter; but of larger diameter and greater power transmission capability. For example, a fiber optic system may transmit 8 mw of light-power via a 125 μm diameter fiber; or 51.3 w per $cm^2$. On this basis, to transmit 2 Kw through a rod, the diameter required is 7 cm. However the actual power transmission capability may be greater. The Sun has a temperature of 5776° K., and emits about 6 $Kw/cm^2$ [2]. The optical system 2 may concentrate sunlight to a "circle of confusion" of 6.5 mm dia. At an incidence of 60° on the plane 33, a 13 mm (½") diameter light-pipe is required to transmit 2 Kw of light-power. The light-power is transmitted through the light-pipe 32 to its exit plane 37. The exit plane 37 may be located at a cavity 38, wherein the rays are dispersed and converted to heat-power at a high temperature $T_1$. The cavity temperature peaks when the input power is balanced by the heat-power load and heat-power losses of the heat-receiver. In the solar cooker shown in FIG. 8, the cavity 38 is at the exit plane 37 of the light-pipe transmitter 32. The heat-assembly 41 may contain a phase-change material 42 to store heat energy. The heat-power from the cavity 38 melts the phase change material 42 and stores heat energy at its melting point $T_1$. The heater assembly 41 may be employed as an oven which will maintain its temperature for many hours after sundown. Various phase-change materials having particular melting points $T_1$ are known. [3], [4]. A preferred phase change material useful for cooking, is the magnesium-zinc eutectic $MgZn_2$ which has these properties:

Melting Point: 340° C. (644° F.)
Specific Heat: j/Kg-°K.
Latent Heat: $4.7 \times 10^5$ j/Kg FIG. 5 shows a block diagram of the solar-electrical power, control and drive circuit for operating the sun-follower of this invention.

A master clock in the control circuit provides a timing frequency proportional to ω the sun-angle, which increases uniformly according to the time of the day; 0° at 0600 (sunrise) in the morning; 90° at 1200 (noon) and 180° at 1800 (sunset). The angular velocity of the sun is:

$$\dot{\omega} = 180°/12 \times 3600 = 4.166 \times 10^{-3}°/s = 15°/hr.$$

The computer 45 is driven by a program containing the equations hereinafter derived; providing servomotor drive signals α and ε, from the clock frequency signal ω. The seasonal angle φ is also derived from. The latitude angle 0 is fixed at a given location.

The Cassegrain Reflector optical system focusses sun-light on a fixed point O. A light sensor 10 is mounted on the optical axis 3 in front of the secondary reflector 6, pointing toward the sun. The optical axis of the Cassegrain optical system photoelectromechanically follows and point to the sun.

The computer module 45 is controlled by signal angle produced by the clock 46. The angles α, ε and φ are derived from the clock angle signal ω. The signals α and ε drive the servomotors 28 and 29, and position the optical axis of the sunfollower in the direction of the sun to a first approximation; for example: ±3°. The quadrant photosensor 10 provides error signals to the computer 45 which over-ride the clock driven signal ω. The servomotors 28 and 29 thereby position the optical axis to ±1° of the direction of the sun's rays.

During the day, signals α and ε cause the optical axis of the sunfollower to point approximately toward the direction of the sun whether or not it is obscured; for example, by a cloud. When sunlight is present, the signals from the quadrant photosensor over ride the signals from the clock angle signal, and the sunfollower is accurately pointed toward the sun under servomotor control.

The computer program 47 directs the sunfollower to track the sun from sunup to sundown; reverse its motion at night; and, be positioned to track the sun again at sunup on the following morning.

The computer 45 controls the switching of the electric power to the servomotors. The electric power is supplied from the rechargeable storage battery 63 to first and second servoamplifiers 48 and 49, respectively for the servomotors 28,29. The servomotors may comprise two 12 watt D.C. motors operating on a 5% to 10% duty cycle. A photovoltaic light-electric power converter 9 is mounted in front of the secondary reflector 6.

The photovoltaic light-electric power converter 9 may comprise a circular area with a central hole, in which is mounted the quadrant photosensor 10. In sunlight the photovoltaic converter 9 supplies about 5 watts electric power to the rechargeable storage battery 63, which supplies 24 watts on demand to the servomotors. The duty cycle is short, and the average power is about 2 watts. Sunlight incident on the photovoltaic converter 9 provides the electric power to charge the rechargeable storage battery 63, when little or no power is drawn by the system.

Figures 6, 7, 8, 9:
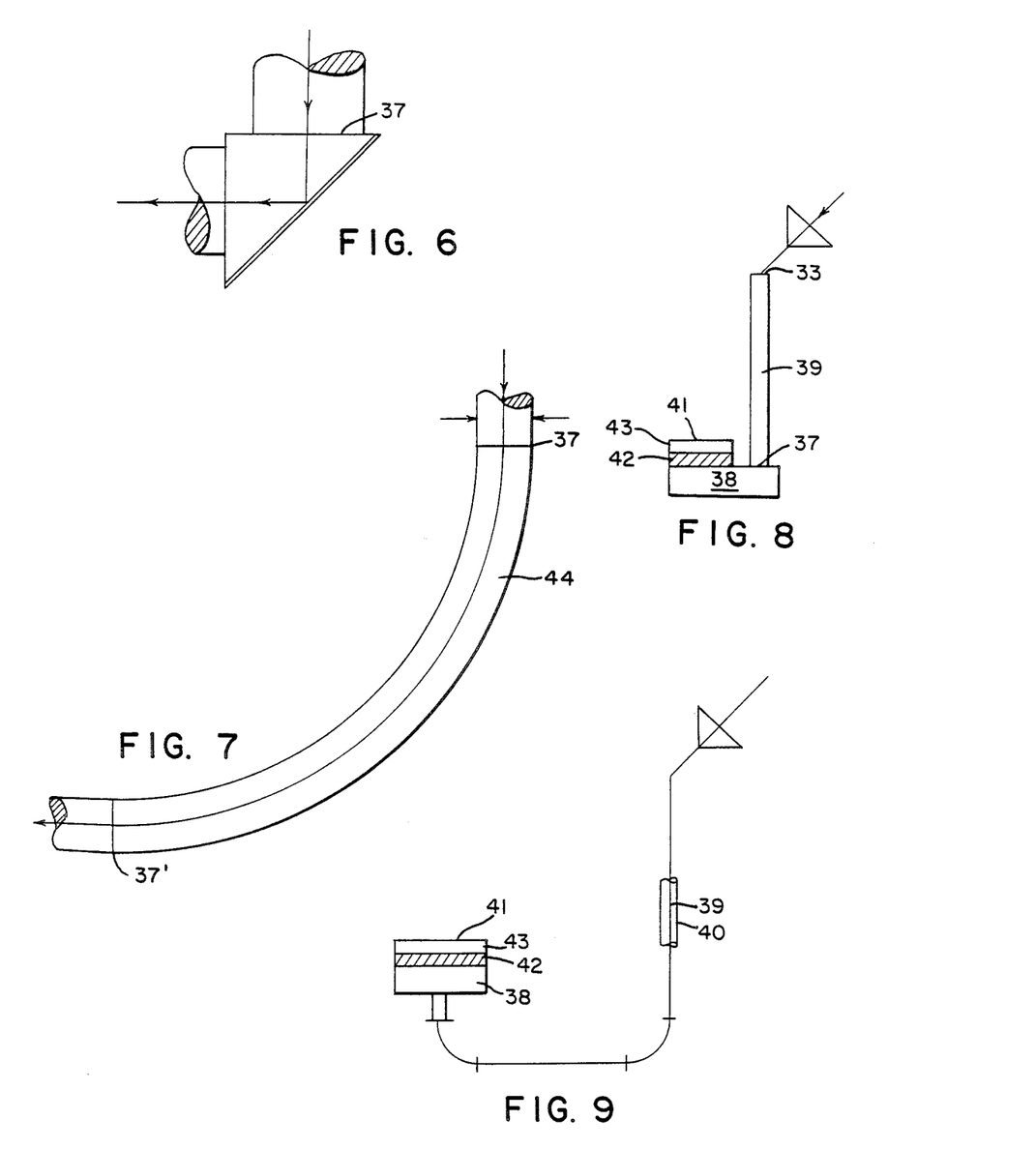
FIG. 6 shows, to half scale, a cross sectional view of a light-pipe and a prism with an internal reflecting surface for a 90° change in the direction of light-power transmission.
FIG. 7 shows, to one-quarter scale, a cross sectional view of a curved light-pipe for a change in the direction of transmission of light-power.
FIG. 8 shows a diagram of a system for the transmission of light-power over a considerable distance from a sunfollower to a heater, using a straight light-pipe.
FIG. 9 is the same as FIG. 8, except that the light-pipe has two 90° curved sections to change the direction of the light-power transmission by 180°.
Figure 11:
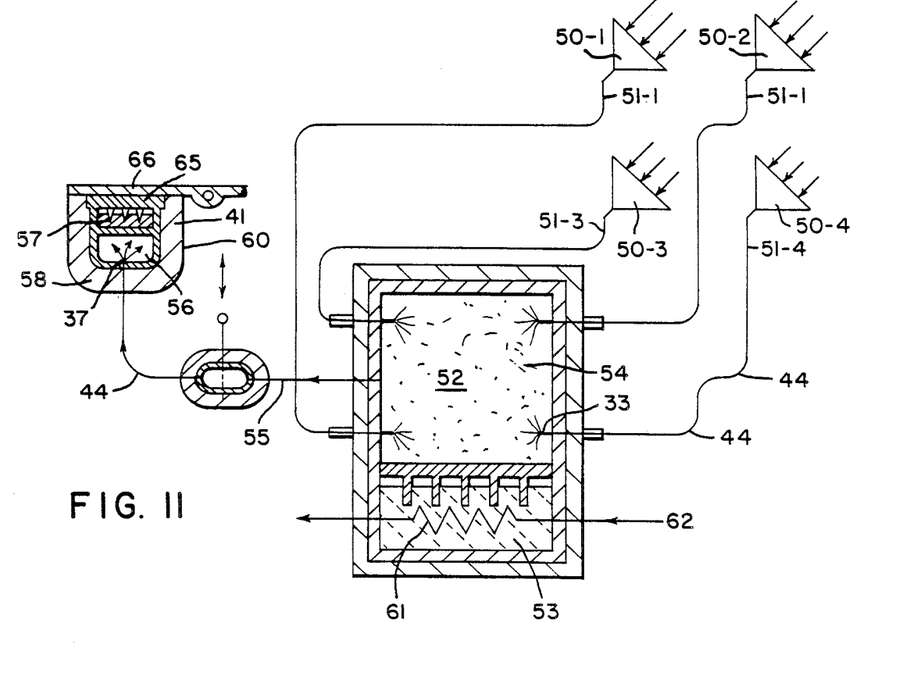
FIG. 11 shows a diagram of four sunfollowers supplying light-power to a single primary cavity which includes a high temperature phase change heat storage material used as a heat source to supply heat-power to a heat/electric power generator; and/or, to supply heat-power through a valve to a secondary heating element.

The system functions automatically, compensating for differences in the seasons. It may be employed to transmit light power from one or more sun-followers over considerable distances, under ground, through building walls or floors to one or more cavities for use in a variety of applications, such as stoves for cooking, illumination of remote areas, heat-electric power generators, and other purposes. With a highly transparent light-pipe rod, the distance may vary from a fraction of a meter to one or more Km. The light pipe absorbs little power as transmission loss and therefor remains at nearly ambient temperature. The light power is converted to high temperature heat only when the light-power is delivered to an insulated cavity. FIG. 8 shows light-power transmitted by a straight rod 39 placed vertically. It may be located on the outside of the building, or pass through several building floors (not shown). The light pipe may be placed within and protected by an external tube 40. FIGS. 7, 9 and 11 show light-power transmitted by curved light-pipes 44, with one or more 90° turns. The light-pipe exits into the bottom, side or top of a cavity 38 in the heat-receiver. In the cavity, the light-power is converted to high temperature heat, stored in the phase change material 42, and utilized on platen 43.

FIG. 6 shows a cross sectional view of a light-pipe 32 and a prism 64 with an internal reflecting surface 65 for a 90° change in the direction of light-power transmission along a light-pipe. To assure total internal reflection, the surface 65 may be coated with a high index of refraction material such as titanium dioxide, a high reflectivity multilayer coating, or a metal such as silver or aluminum. Alternatively, the curved light-pipe 44 shown in FIG. 7 may be used for a change in direction of the transmitted light-power. The outside of the pipe may be coated with a high index material.

The versatility of the sunfollower light-pipe combination is illustrated in FIG. 11. An array of sunfollowers 50-1,50-2, . . . 50-n supplies light power to a plurality of light-pipes 51-1,51-2, . . . 51-n. For example, a 10×10 array of 100 sunfollowers 50 supplies light-power to 100 light-pipes 51 which terminate in a single primary cavity 52. In the primary cavity the light-power is converted to heat energy and stored in a primary phase change material 53 at high temperature $T_1$. A preferred primary phase change material is silicon which melts at $T_1 = 1683°$ K., and has a large heat-storage capacity per unit weight. [4.1]. The silicon may be placed, without a cover, directly at the bottom of a primary cavity filled with an inert gas 54, such as Argon. At 1683° K. the radiant power emitted through an aperture in the primary cavity is 45 w/cm² [5]. Heat-power is directly transmitted by infrared radiation through a secondary light-pipe 55 from the primary cavity 52 to a secondary cavity 56. The secondary cavity contains a secondary phase change material 57 such as $MgZn_2$ melting at a temperature $T_2 = 613°$ K. [4.2]. At this temperature, the infrared heat-power emitted through an aperture in the secondary cavity 56 is 0.85 w/cm² [5]. Infrared heat-power is transmitted along the secondary light-pipe in two directions, to and from the primary and secondary cavities. The forward/reverse ratio of radiation flow along the secondary light-pipe 55 is about 50. When heat-power is not used, no net heat-power is transmitted in either direction, except to compensate for small heat-loss. An insulation material 58 surrounds the light-pipe for a short distance from each cavity. Since the heat conductivity of a glass light-pipe is small, its temperature becomes ambient in a small distance, and is ambient over its major length.

It will be understood that transmission means of heat-power from a source to a receiver other than a light-pipe may be employed.

For example, FIGS. 1, 2 and 3 show light power from the optical system 2 directly focussed on the aperture 15 of a hemispherical cavity 16 in the upper end of an axially oriented graphite rod 64. A transparent hemispherical dome 17 is placed over the aperture to prevent atmospheric oxygen from reacting with the high temperature surface of the graphite in the cavity. The axially oriented graphite rod has a preferential heat conductance along the rod axis. The rod is immersed directly into the phase-transfer material 42. Alternatively, a conducting metal rod of aluminum, copper or steel may be used.

The term "heat receiver" refers to various uses for the heat-power eventually provided by the sunfollower. For example, the heat-power may be employed for a cooking stove; a heat/electric power generator, which be a conventional reciprocating steam-engine or turbine, or an (ETD) electrothermodynamic generator using a charged aerosol for the direct conversion of heat-power to electric power without the use of mechanical moving parts [6]. A variety of applications requiring a source of heat-power may utilize the heat-power produced by the present invention. Another use of this invention is the direct utilization of transmitted light to an internal room for illumination purposes.

MATHEMATICAL PHYSICS SECTION

Figure 10:
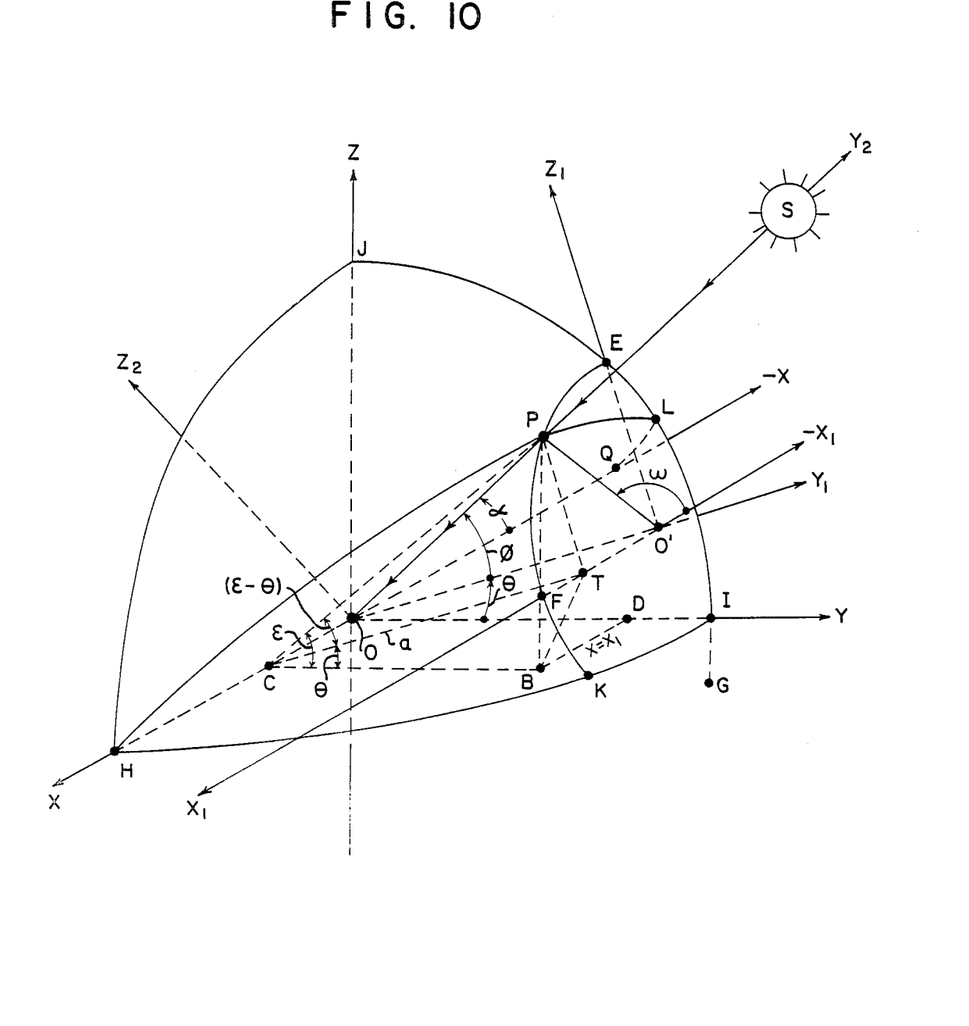
FIG. 10 shows a diagram of the geometry relating the angles between the position of the optical axis of the sunfollower on the semicircular track and the direction of the sun's rays according to time of day, season and latitude.

FIG. 10 is a diagram of the solid geometry relating the polar coordinate angles between the optical axis of the sunfollower and the direction of the sun's rays, the latitude angle $\theta$, seasonal angle $\phi$, and clock angle $\omega$. The optical axis of the sunfollower is constrained to move along a semicircular track at an angle $\alpha$ to the horizontal. The plane of the semicircular track is at an angle $\epsilon$ to the horizontal plane.

| SYMBOLS | | |
| --- | --- | --- |
| $\theta$ | latitude angle | ° |
| $\phi$ | seasonal angle | ° |
| $\omega$ | clock angle | ° |
| $\alpha$ | angular position of the optical axis of the sunfollower along a semicircular track with its horizonal axis parallel to the OX north-south axis. | ° |
| $\epsilon$ | angle between the plane of the semicicular track and the horizontal plane. | ° |
| R | radius of the semicircular track. | m |
| r | radius of the circle intercept EPK on the sphere HIJ about the point O. The point P is the intercept of the sun's ray SO on this sphere. The center of the circle arc EPK is at O' on the axis $OY_l$, which makes the latitude angle 0 with the horizontal axis O, in the equatorial plane XOY of the sphere HIJ. | m. |

DERIVATION OF EQUATIONS

FIGS. 1 and 2 show respectively cross sectional front and side views of the sunfollower mounted on a Solar Cooker. The sunfollower comprises a Cassegrain optical system mounted on a carriage 25 which runs on the semicircular track 22. The sun is focussed on the fixed point 0, the origin of the OXYZ coordinate system.

FIG. 10 shows a diagram of the geometry relating the angles between the position of the optical axis of the sunfollower on the semicircular track and the direction of the sun's rays according to time of day, season and latitude.

The limits on the angles $\theta$, $\phi$ and $\omega$ are, respectively:

$$0° < \theta < -45° \quad (1)$$

$$68° < \phi < 130° \quad (2)$$

$$30° < \omega < 150° \quad (3)$$

The latitude angle $\theta = \sphericalangle YOY'$, the angle between the OY and the OY' axes.

The plane QLPH of the semicircular track rotates about the horizontal axis XOX' at an angle $\epsilon = PCB$ to the horizontal XOY plane. The point P on the axis of the optical system travels along the semicircular track at an angle $\alpha = (-X_1)OP$ to the horizontal axis XOX'. The sun appears to travel along a circle EPK with its center at O' on the $OY_1$ axis. The clock angle $\omega = (-X_1)O_1P$ increases proportionally to the time of day. It is measured from the $O_1(-X_1)$ axis in the $X_1Y_1Z_1$ coordinates with its origin at O'. The coordinate intercepts x and $x_1$, of the point P respectively on the OX and $O_1X_1$ axes are the same:

$$x = x_1 = r \cos \omega \quad (4)$$

Simultaneously, the point P is travelling along the semicircular track intercepting the semicircle QLPH on the sphere HIJ. This great circle has its diameter coincident with the OX axis. The semicircular track lies in the plane XOP, and is rotated through the angle $\epsilon$ to the horizontal plane XOY.

The radius vector OP rotates along the semicircular path QLPH in the plane XOP about the point 0 through an angle $\bullet = (-X)OP$, measured from the $-X$ axis. The intercept of OP on the OX axis is:

$$x = R \cos \alpha \quad (5)$$

$$\sin \phi = r/R \quad (6)$$

Solving for the angle $\alpha$, from (4), (5) and (6):

$$\alpha = \cos^{-1}[(\sin \phi) \cos \omega] \quad (7)$$

The points PTBC all lie in the same plane a distance $OC = x = x_1$ from the origin 0. In the right triangle PCB:

$$\text{Angle } PCB = \epsilon \quad (8)$$

In the right triangle PTC, CT=OO', and:

$$\text{Angle } PCT = (\epsilon - \theta) \quad (9)$$

$$PT = r \sin \omega \quad (10)$$

$$CT = R \cos \phi \quad (11)$$

Therfore:

$$\tan(\epsilon - \theta) = r \sin \omega / R \cos \omega \quad (12)$$

$$\tan(\epsilon - \theta) = (\sin \theta)(\sin \omega / \cos \omega) \quad (13)$$

Solving for $\epsilon$:

$$\epsilon = \theta + \tan^{-1}[(\sin \phi) \tan \omega] \quad (14)$$

In a similar manner a slowly changing equation to take account of the seasonal variation of the angle $\phi$ may be included. Once the latitude angle $\theta$ is fixed, the final equations have only one independent variable: the clock angle.

Summarizing, the basic equations for $\alpha$ and $\epsilon$ are (7) and (14) respectively.

In an application of this invention shown in FIG. 11, the heater 60 for example, may comprise an open stove enclosing a secondary cavity 56 and a secondary phase change material 57. The heater 60 has a platen 65 with metal ribs 59 dipping into the secondary phase change material. The metal ribs 59 conduct heat to the platen. A hinged lid 66 prevents heat loss when the platen is not in use.

FIG. 11 also shows another application of this invention: a high temperature solar heat source to supply substantial quantities of heat-power for heat/electric power generation. A heat exchanger 62 is located at the bottom of the primary cavity 52, immersed in the primary phase change material 53 at temperature $T_1$. Heat-power is transferred from the primary phase change material to a working fluid 63 circulating in the heat exchanger 62, and supplied to a heat/electric power generator. The heat/electric power generator may be a conventional type, or an electrothermodynamic ETD generator previously described. [6].

Other uses, applications and modifications of this invention will be apparent to those skilled in the art.

REFERENCES

1. FIBER OPTICS; pp. E46–62, Book 2, Encyclopedia/Dictionary 1984; Optical Industry and Purchasing Directory; P.O. Box 1146; Berkshire Common, Pittsfield, Mass. 01202.
2. Table, page F 129; Handbook of Chemistry and Physics; 65th Edition, 1984–85; CRC Press, Inc.; Boca Raton, Fla.
3. Molten Salt Thermal Energy Storage System; Tables : pages 10 and 11; Institute of Gas Technology; IIT Center, 3424 S. State Street; Chicago, Ill., 60616; Project 8981 Final Report March 1978; U.S. Department of Energy; Contract No. EY-76-02-2888; NASA CR 135419.
4. Thermal Storage in Metals; Pages 138–154; 4.1. Table 2 Page 142; 4.2. Table 3, Page 144; Birchenall and Telkes; Institute of Energy Conversion; University of Delaware; Newark, Del.
5. Total Black Body Radiation; Table pages 6–66 to 6–67; American Institute of Physics Handbook; McGraw Hill Book Co., Inc; New York, N.Y. 1957.
6. An Electrothermodynamic Generator with Converging Flows; U.S. Pat. No. 4,617,483; Alvin M. Marks; Issued Oct. 14, 1986.

Having fully described my invention what I wish to claim is:

1. In a system for collecting, transmitting and receiving rays of light-power from the sun, a mounting base for said system, a focal point for said rays positioned on said base, a first axis on a first straight line through said focal point, a second axis on a second straight line from said sun through said focal point and focussing said rays concentric with said first axis, a first means to align with first axis with said second axis and the focal point, the optical system thereby intercepting and converging said rays of light power through said focal point, a receiver for said rays on said base, said focal point being located between said optical system and said receiver and a second means for transmitting said rays of light power from said focal point to said receiver, said system further including means for semi-circular motion about the focal point.

2. A system for collecting, transmitting and receiving sun-power according to claim 1, in which said first means comprises a semicircular track having its center at said focal point 0 on an OX axis, said semicircular track being in an XOP plane rotatable about said OX axis, a carriage travelling along said track, said optical system being mounted on said carriage, said optical axis OP making an angle XOP=$\alpha$ with said OX axis, and said XOP plane making an angle $\epsilon$ with the horizontal plane, a first servo motor and a second servo motor, said first servomotor positioning said optical axis on said carriage at said angle $\alpha$, and said second servomotor positioning said XOP plane at said angle $\epsilon$, control means for said servomotors, whereby said optical axis follows the sun and is aligned with the sun's rays, said sun light-power being converged toward said focus and transmitted by said second means to said receiver.

3. A system for collecting, transmitting and receiving sun-power according to claim 1, in which said optical system in a Cassegrain reflector system, primary and secondary reflectors in said system, a central aperture in said primary reflector, said sun-power being reflected from said secondary reflector through said aperture to said focal point.

4. A system for collecting, transmitting and receiving sun-power according to claim 1, in which said second means is a heat-conducting material in the form of a cylinder, a cavity having an aperture at said focus, said cylinder having one end in contact with said cavity, and the other end in contact with said receiver, whereby light power is concentrated by said optical system into said cavity, converted to heat-power at a temperature $T_1$ and transmitted by said cylinder to said receiver at temperature $T_2$, in which $T_2 < T_1$.

5. A system for collecting, transmitting and receiving sun-power according to claim 1, in which said second means is a liquid-vapor phase heat-pipe, a cavity having an aperture at said focus, said heat-pipe having one end in contact with said cavity and the other end in contact with said receiver, whereby light power is focussed by said optical system into said cavity, converted to heat-power at a temperature $T_1$ and transmitted by said heat-pipe to said receiver at temperature $T_2 < T_1$.

6. A system for collecting, transmitting and receiving sun-power according to claim 1, in which said second means is a light-pipe.

7. A system for collecting, transmitting and receiving sun-power according to claim 6, in which said light-pipe is a transparent cylinder, an axis in said cylinder, plane polished input and output surfaces normal to said axis, whereby incident light is refracted into the said input surface, transmitted through said light-pipe by total internal reflection, and refracted out of said light-pipe at its output surface.

8. A system for collecting, transmitting and receiving sun-power according to claim 7, a concave lens near said focal point, whereby light from said collector is concentrated by said optical system into a narrow beam of parallel light, said beam refracting into the said cylinder at said input surface.

9. A system for collecting, transmitting and receiving sun-power according to claim 7, in which the input and output surfaces of said light-pipe are coated with a low-reflectivity coatings.

10. A system for collecting, transmitting and receiving sun-power according to claim 6, in which said light-pipe is curved whereby said light-power travels with a change of direction to said receiver.

11. A system for collecting, transmitting and receiving sun-power according to claim 6, a totally internally reflecting prism, a first and a second light-pipes having plane end surfaces, said light-pipe end surfaces abutting faces of said prism, whereby said light-power travels with a change of direction from said collector to said receiver.

12. In a system for collecting, transmitting and receiving sun-power according to claim 1; a cavity, a phase change material for heat storage, said phase change material being in contact with said cavity, said transmitter connecting to said cavity and said phase change material, whereby said light-power is converted to heat-power in said cavity and stored in said material, said material melting at a temperature $T_1$ substantially exceeding ambient temperature.

13. A system for collecting, transmitting and receiving sun-power according to claim 12, in which said phase change material is a metal eutectic alloy.

14. A system for collecting, transmitting and receiving sun-power according to claim 13, in which said metal eutectic alloy is Magnesium-Zinc $MgZn_2$ melting at about 613° K.

15. A system for collecting, transmitting and receiving sun-power according to claim 12, in which said phase change material has a melting point in excess of 1500° K.

16. A system for collecting, transmitting and receiving sun-power according to claim 12, in which said phase change material is silicon melting at about 1683° K.

17. In a system for collecting, transmitting and receiving sun-power according to claim 1, a plurality of said collectors, a plurality of primary transmission means from said collectors, an energy depot comprising a primary cavity and a primary heat storage material at temperature $T_1$, said primary transmission means being connected to said energy depot, a plurality of energy receivers comprising secondary cavities and secondary heat storage materials at temperature $T_2 < T_1$, secondary power transmission means between said depot and said receivers, valves in said secondary transmission means, whereby power is withdrawn on demand from said source and delivered to said receivers.

18. A system for collecting, transmitting and receiving sun-power according to claim 17, in which said primary transmission means is a light-pipe for visible light, and said secondary transmission means is a light pipe for the infrared.

19. A system for collecting, transmitting and receiving sun-power according to claim 17, a primary cavity in said distribution depot, a secondary cavity in said secondary heat receiver, primary and secondary phase change materials in said primary and secondary cavities respectively, in which the melting points of said materials have the relationship $T_2 < 2T_1$, whereby light power is transmitted from said primary cavity to said secondary cavity via said secondary light-pipe.

20. A system for collecting, transmitting and receiving sun-power according to claim 19, in which $T_2 > 1500°$ K. and $T_1 < 700°$ K.

21. A system for collecting, transmitting and receiving sun-power according to claim 17, in which the primary and secondary heat storage materials are Silicon and MgZn$_2$, respectively.

22. A method for collecting, transmitting and receiving sun-power consisting of the steps of concentrating sun-power using an optical system including a means for semi-circular motion about the focal point, refracting said concentrated light-power into a transparent surface on a light-pipe, and transmitting said light power in said light-pipe to a cavity in a receiver.

23. A method for collecting, transmitting and receiving sun-power according to claim 22, including the further step of storing said light-power as heat in a phase change material in said cavity.

24. A method for collecting, transmitting and receiving sun-power according to claim 23, including the still further step of storing the light-power from said secondary light-pipe in a secondary phase change material in said secondary cavity.

25. A method for collecting, transmitting and receiving sun-power consisting of the steps of concentrating sun-power using and optical system including a means for semi-circular motion about the focal point, refracting said concentrated light-power into a transparent surface on a primary light-pipe, transmitting said light power in said light-pipe to a primary cavity in a primary receiver, including the still further step of transmitting light-power from said primary cavity via a secondary light-pipe to a secondary cavity in a secondary receiver.

* * * * *